US007889127B2

(12) United States Patent
Sajuyigbe et al.

(10) Patent No.: US 7,889,127 B2
(45) Date of Patent: Feb. 15, 2011

(54) WIDE ANGLE IMPEDANCE MATCHING USING METAMATERIALS IN A PHASED ARRAY ANTENNA SYSTEM

(75) Inventors: Soji Sajuyigbe, Durham, NC (US); David R. Smith, Durham, NC (US); Steven Cummer, Chapel Hill, NC (US); Victor S. Starkovich, Maple Valley, WA (US); Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 12/234,814

(22) Filed: Sep. 22, 2008

(65) Prior Publication Data

US 2010/0073232 A1 Mar. 25, 2010

(51) Int. Cl.
*G01S 3/00* (2006.01)
*G01S 13/00* (2006.01)

(52) U.S. Cl. ........................ 342/372; 343/776; 343/778

(58) Field of Classification Search ................. 342/372; 343/776, 778
See application file for complete search history.

(56) References Cited

U.S. PATENT DOCUMENTS 3,577,147 A * 5/1971 Hannan ...................... 343/778
2004/0017322 A1* 1/2004 Bostwick et al. ............ 343/776

OTHER PUBLICATIONS

Alù, Andrea et al. "Pairing an Epsilon-Negative Slab with a Mu-Negative Slab: Resonance, Tunneling and Transparency." IEEE Transactions on Antennas and Propagation, vol. 51, No. 10, Oct. 2003, pp. 2558-2571.

Amitay, Noach et al. "Theory and Analysis of Phased Array Antennas." Wiley, John & Sons, Inc., Mar. 1972.

Borgiotti, Giorgio V. "Modal Analysis of Periodic Planar Phased Arrays of Apertures." Proceedings of the IEEE, vol. 56, No. 11, Nov. 1968, pp. 1881-1892.

Borgiotti, Giorgio V. "Radiation and Reactive Energy of Aperture Antennas." IEEE Transactions on Antenna and Propagation Jan. 1963, pp. 94-95.

Chair, R. et al. "Experimental Investigation for Wideband Perforated Dielectric Resonator Antenna." Electronics Letters, Feb. 2, 2006, vol. 42, No. 3.

(Continued)

*Primary Examiner*—Thomas H Tarcza
*Assistant Examiner*—Harry Liu
(74) *Attorney, Agent, or Firm*—Charles L. Moore; Moore & Van Allen PLLC

(57) ABSTRACT

A phased array antenna system may include a sheet of conductive material with a plurality of aperture antenna elements formed in the sheet of conductive material. Each of the plurality of aperture antenna elements is capable of sending and receiving electromagnetic energy. The phased array antenna system may also include a wide angle impedance match (WAIM) layer of material disposed over the plurality of aperture antenna elements formed in the sheet of conductive material. The WAIM layer of material includes a plurality of metamaterial particles. The plurality of metamaterial particles are selected and arranged to minimize return loss and to optimize an impedance match between the phased array antenna system and free space to permit scanning of the phased array antenna system up to a predetermined angle in elevation.

19 Claims, 3 Drawing Sheets

OTHER PUBLICATIONS

Eleftheriades, George V. et al. "Planar Negative Refractive Index Media Using Periodically L—C Loaded Transmission Lines." IEEE Transactions on Microwave Theory and Techniques, vol. 50, No. 12, Dec. 2002, pp. 2702-2712.

Farrell, G.F. et al. "Mutual Coupling in Infinite Planar Arrays of Rectangular Waveguide Horns." IEEE Transactions on Antennas and Propagation, vol. AP-16, No. 4, Jul. 1968, pp. 405-414.

Lai, Anthony et al. "Composite Right/Left-Handed Transmission Line Metamaterials." IEEE Microwave Magazine, Sep. 2004, pp. 35-50.

Lanne, Maria. "An Analysis of a Finite Dipole Array Using Infinite Array Data."

Magill, E.G. "Wide-Angle Impedance Matching of a Planar Array Antenna by a Dielectric Sheet." IEEE Transactions on Antennas and Propagation, vol. AP-14, No. 1, Jan. 1966, pp. 49-53.

Marqués, Ricardo. "Role of Bianisotropy in Negative Permeability and Left-Handed Metamaterials." Physical Review B, vol. 65, 2002 The American Physical Society, pp. 144440-1-0144440-6.

Maslovski, Stanislav et al. "Phase Conjugation and Perfect Lensing." Journal of Applied Physics, vol. 94, No. 7, Oct. 1, 2003, pp. 4241-4243.

Munk, Ben A. "Finite Antenna Arrays and FSS." Wiley, John & Sons, Inc. Aug. 2003.

Munk, Ben A. "Frequency Selective Surfaces: Theory and Design." Wiley, John & Sons, Inc. Apr. 2000.

Parad, L.I. "The Input Admittance to a Slotted Array With or Without a Dielectric Sheet." IEEE Transactions on Antennas and Propagation, Mar. 1967, pp. 302-304.

Pozar, David M. "Microwave Engineering." Wiley, John & Sons, Inc. Jan. 2004.

Schurig, D. et al. "Electric-field-coupled Resonators for Negative Permittivity Metamaterials." Applied Physics Letters, vol. 88, 2006 American Institute of Physics, pp. 041109-1-041109-3.

Schurig, D. et al. "Metamaterial Electromagnetic Cloak at Microwave Frequencies." Science, vol. 314, Nov. 10, 2006, pp. 977-980.

Shelby, R.A. et al. "Experimental Verification of a Negative Index of Refraction." Science, vol. 292 Apr. 6, 2001, pp. 77-79.

Smith, D.R. et al. "Composite Medium with Simultaneously Negative Permeability and Permittivity." Physical Review Letters, vol. 84, No. 18, May 1, 2000, pp. 4184-4187.

Smith, D.R. et al. "Determination of Effective Permittivity and Permeability of Metamaterials from Reflection and Transmission Coefficients." Physical Review B, vol. 65, 2002 The American Physical Society, pp. 195104-1-0195104-5.

Smith, D.R. et al. "Gradient Index Metamaterials." Physical Review E, vol. 71, 2005 The American Physical Society, 036609-1-036609-6.

Stark, Louis. "Microwave Theory of Phased-Array Antennas—A Review." Proceedings of the IEEE, vol. 62, No. 12, Dec. 1974, pp. 1661-1701

Stark, Louis. "Radiation Impedance of a Dipole in an Infinite Planar Phased Array." Radio Science, vol. 1 (New Series), No. 3, Mar. 1966, pp. 361-377.

Wheeler, Harold A. "The Grating-Lobe Series for the Impedance Variation Antenna in a Planar Phased-Array." IEEE Transactions on Antennas and Propagation, vol. AP-14, No. 6, Nov. 1966, pp. 707-714.

Ziolkowski, Richard W. "Metamaterial-Based Efficient Electrically Small Antennas." IEEE Transactions on Antennas and Propagation, vol. 54, No. 7, Jul. 2006, pp. 2113-2130.

* cited by examiner

WIDE ANGLE IMPEDANCE MATCHING USING METAMATERIALS IN A PHASED ARRAY ANTENNA SYSTEM

This invention was made with Government support under HR0011-05-C-0068 awarded by DARPA. The government has certain rights in this invention.

FIELD

The present invention relates to antennas, antenna arrays and the like, and more particularly to wide angle impedance matching (WAIM) using metamaterials in a phased array antenna system.

BACKGROUND OF THE INVENTION

Currently existing phased array antenna systems when scanned at wide elevation angles, such as past sixty degrees from an angle normal or perpendicular to the face of the array, experience severe reflections that can prevent detectable signals from being transmitted or received. Isotropic dielectric materials have been used for impedance matching of phased array antennas in attempts to improve at large scan angles but improvements have been limited.

BRIEF SUMMARY OF THE INVENTION

In accordance with an embodiment of the present invention, a phased array antenna system may include a sheet of conductive material with a plurality of aperture antenna elements formed in the sheet of conductive material. Each of the plurality of aperture antenna elements is capable of sending and receiving electromagnetic energy. The phased array antenna system may also include a wide angle impedance match (WAIM) layer of material disposed over the plurality of aperture antenna elements formed in the sheet of conductive material. The WAIM layer of material includes a plurality of metamaterial particles. The plurality of metamaterial particles are selected and arranged to minimize return loss and to optimize an impedance match between the phased array antenna system and free space to permit scanning of the phased array antenna system up to a predetermined angle in elevation and all azimuthal angles.

In accordance with another embodiment of the present invention, a communications system may include a transceiver to transmit and receive electromagnetic signals and a tracking and scanning module coupled to the transceiver. A phased array antenna system may be coupled to the tracking and scanning module. The phased array antenna system may include a sheet of conductive material with a plurality of aperture antenna elements formed in the conductive sheet. Each of the plurality of aperture antenna elements may be capable of sending and receiving electromagnetic energy. The phased array antenna system may also include a wide angle impedance match (WAIM) layer of material disposed over the plurality of aperture antenna elements formed in the sheet of conductive material. The WAIM layer of material includes a plurality of metamaterial particles. The plurality of metamaterial particles are selected and arranged to minimize return loss and to optimize an impedance match between the phased array antenna system and free space to permit scanning of the phased array antenna system up to a predetermined angle in elevation.

In accordance with another embodiment of the present invention, a method for widening an angular scanning range of a phased array antenna system may include forming a wide angle impedance match (WAIM) layer of material. Forming the WAIM layer of material may include selecting and arranging a plurality of metamaterial particles to minimize return loss and to optimize an impedance match between the phased array antenna system and free space to permit scanning of the phased array antenna system up to a predetermined angle in elevation. The method may further include disposing the WAIM layer of material on a plurality of aperture antenna elements formed in a sheet of conductive material to form the phased array antenna system.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the invention. Other embodiments having different structures and operations do not depart from the scope of the present invention.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
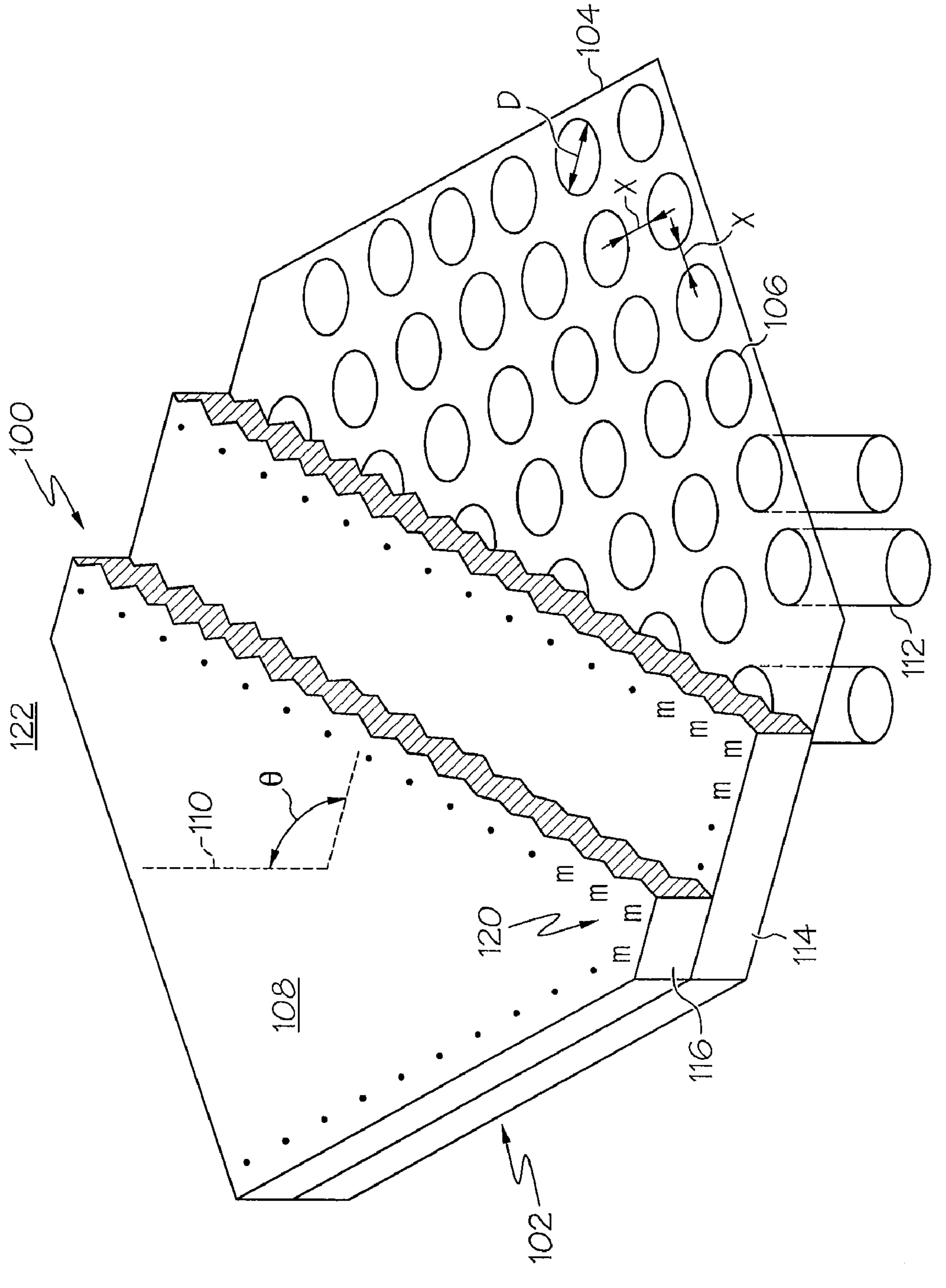
FIG. 1 is a perspective view of an example of a phased array antenna system with a wide angle impedance match (WAIM) feature using metamaterials in accordance with an aspect of the present invention.

FIG. 1 is a perspective view of an example of a phased array antenna system 100 with a wide angle impedance match (WAIM) feature 102 using metamaterials in accordance with an aspect of the present invention. The phased array antenna system 100 may include a sheet of conductive material 104. A plurality of aperture antenna elements 106 or radiating apertures may be formed in the conductive sheet 104. The aperture antenna elements 106 may collectively send and/or receive electromagnetic energy and, as described herein, may be controlled to scan to a large angle θ of radiation propagation relative to a normal or perpendicular angle relative to a front face 108 of the phased array antenna system 100 as illustrated by the dashed or broken line 110.

The aperture antenna elements 106 may be uniformly arranged to form the phased array antenna system 100. The aperture antenna elements 106 may be uniformly spaced from one another by a distance X and may have a predetermined opening size or diameter D. The distance X and opening size D will be a function of the operating parameters of the phased array antenna system 100, such as operating frequency and wavelength.

Each of the plurality of aperture antenna elements 106 may be fed by a waveguide 112. The aperture antenna elements 106 may be substantially circular in shape or may be formed in other shapes depending upon the desired radiation characteristics or other properties. Each of the waveguides 112 may have a cross-section corresponding to the shape of the aperture antenna elements 106. The waveguides 112 may couple the apertures elements 106 to a communications system (not shown in FIG. 1) similar to that described with reference to FIG. 5 to transmit and receive electromagnetic signals.

One or more wide angle impedance match (WAIM) layers 114 and 116 of material may be disposed over the plurality of aperture antenna elements 106 formed in the sheet 104 of conductive material. Each of the WAIM layers 114 and 116 may include a plurality of metamaterial particles 120. The plurality of metamaterial particles 120 may be selected and arranged in a predetermined order or pattern substantially completely across each of the WAIM layers 114 and 116 similar to that illustrated in FIG. 2 to optimize an impedance match between the phased array antenna system 100 and free space 122 beyond the antenna array system 100 and to substantially minimize reflection or return loss of electromagnetic signals to permit scanning the phased array antenna system up to a predetermined angle in elevation. The dots represent additional metamaterial particles. As described herein properties of the WAIM layer or layers 114 and 116 may be selected, adjusted or tuned to provide substantially minimized return loss at an angle of scan θ of at least about 80 degrees to the normal 110 of the front face 108 of the phased array antenna system 100.

Figure 2:
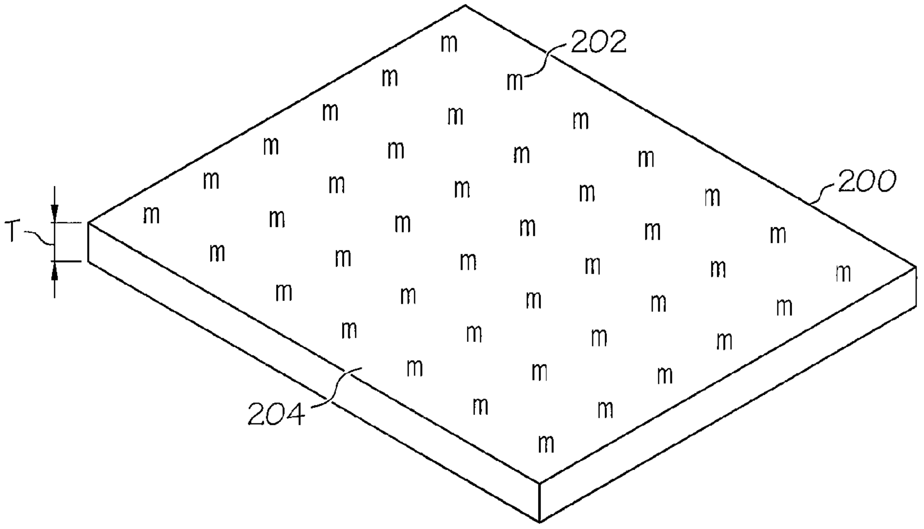
FIG. 2 is an example of a wide angle impedance match (WAIM) layer of material using metamaterials in accordance with an aspect of the present invention.

Also referring to FIG. 2, FIG. 2 is an example of a wide angle impedance match (WAIM) layer 200 of material using metamaterials 202 in accordance with an aspect of the present invention. The metamaterials 202 are arranged in a predetermined uniform pattern to minimize return loss and to optimize an impedance match between the phased array antenna system, such as system 100 in FIG. 1 and free space 122, to permit scanning a radiating wave or electromagnetic signal in the wide angle of at least about 80 degrees from the normal 110.

Figure 3:
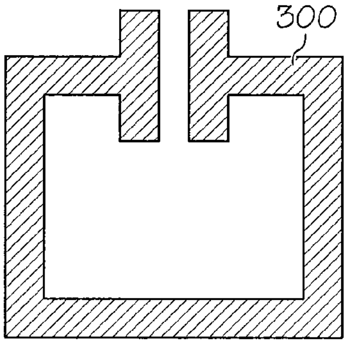
FIG. 3 is an example of a magnetic metamaterial particle in accordance with an aspect of the present invention.
Figure 4:
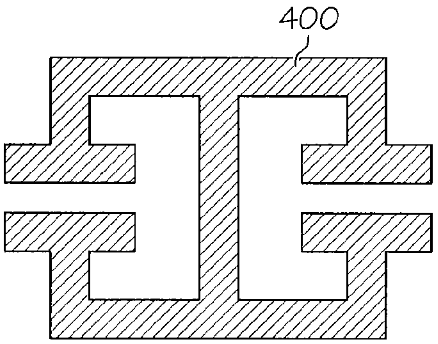
FIG. 4 is an example of an electric metamaterial particle in accordance with an aspect of the present invention.

As determined by the geometry, orientation, topology and physical parameters of the metamaterial elements, the metamaterials 120 (FIG. 1) or 202 (FIG. 2) may be selected to have different electrical and magnetic properties. The plurality of metamaterials 120 and 202 may include magnetic metamaterials particles and electric metamaterial particles. The magnetic metamaterial particles provide or elicit a predetermined magnetic response when energized or when radiating or receiving electromagnetic energy. The electric metamaterial particles provide or elicit a predetermined electrical response when energized or when radiating or receiving electromagnetic energy. Referring also to FIGS. 3 and 4, FIG. 3 is an example of a magnetic metamaterial particle 300 in accordance with an aspect of the present invention, and FIG. 4 is an example of an electric metamaterial particle 400 in accordance with an aspect of the present invention. The exemplary magnetic metamaterial particle 300 illustrated in FIG. 3 is a split ring resonator (SRR). The exemplary electric metamaterial particle 400 illustrated in FIG. 4 is an electric inductor-capacitor resonator (ELC). The configurations or structures of the metamaterial particles 300 and 400 in FIGS. 3 and 4 are merely examples and other forms of magnetic and electric metamaterial particles or other subwavelength particles that elicit a specific magnetic and electric response as described herein to provide impedance matching and a large scan angel θ may also be used.

The magnetic metamaterial particles 300 and the electric metamaterial particles 400 may be periodically arranged in a predetermined pattern or order relative to one another similar to that illustrated in FIG. 2 to provide the optimum impedance match between the phased array antenna system 100 and free space 122 for wide angle scanning of the radiation wave or beam. For example, the magnetic metamaterial particles 300 and the electric metamaterial particles 400 may be interwoven to optimize the impedance match and provide the wide angle scanning. In another embodiment, a combination of interwoven arrays of two disparate magnetic particles may be co-arranged with interwoven arrays of two disparate electric particles in order to achieve at least two independent magnetic permeabilities and two independent electric permittivities in perpendicular directions of three-dimensional space. A material without the same magnetic permeability or electric permittivity in all three spatial dimensions is known as anisotropic. This invention refers to an anisotropic WAIM layer made up of subwavelength metamaterial elements.

The metamaterial particles 300 and 400 may be arranged in different patterns in the plurality of WAIM layers 114 and 116 to provide different operating characteristics and wide angle scanning. The WAIM layers 114, 116 and 200 may also have varying thicknesses "T" as illustrated in FIG. 2 which may be adjusted to providing varying operating characteristics. The metamaterial particles 300 and 400 may be formed on the surface 204 of the WAIM layer 200 or may be embedded within the WAIM layer 200 and may be arranged in a selected orientation to provide the desired operating characteristics of optimum impedance matching and wide angle scanning. The WAIM layer 200 may be formed from a dielectric material and the metamaterial particles 202 from a conductive material, such as copper, aluminum or other conductive material. The metamaterials may be formed or embedded in the WAIM layer 200 using similar techniques to that used in forming semiconductor materials, such as photolithography, chemical vapor deposition, chemical etching or similar methods.

The selection and arrangement of the metamaterials 300 and 400 permit formation of an anisotropic WAIM layer of material wherein the material parameters may be different in different directions with the layer of material to provide optimum impedance matching and minimum return loss or reflection of the electromagnetic signal. In accordance with an aspect of the present invention, the selection and arrangement of the metamaterial particles 300 and 400 permit the permittivity in different directions ($\epsilon_x$, $\epsilon_y$, $\epsilon_z$) with the WAIM layer and the permeability in different directions ($\mu_x$, $\mu_y$, $\mu_z$) to be controlled to optimize the impedance match between the phased array antenna system 100 and the free space 122 and thereby to permit wider angle scanning of the phased array 100 of at least about 80 degrees than has been previously been achievable with other material layers, such as isotropic dielectric layers and the like. The geometry and dimensions of the elements in the WAIM layer 200 or layers 114 and 116 may also be varied to adjust or tune the material characteristics, such as permittivity and permeability. There is no limit to the number of metamaterial WAIM layers used to provide optimum matching for the antenna.

In accordance with one aspect of the present invention, the permittivities ($\epsilon_x$, $\epsilon_y$, $\epsilon_z$) in different directions or orientation and the permeabilities ($\mu_x$, $\mu_y$, $\mu_z$) in different directions or orientations in the WAIM layer may be determined by calculating the active element admittance that provide the minimum amount of reflected power or in other words, provides the maximum ratio of radiated (transmitted) power (PT) to input power (PI) at all scan angles theta (θ). This ratio may be expressed as equation 1.

$$PT/PI=(1-|\Gamma(\theta|^2)\cos\theta \qquad \text{Eq. 1}$$

The permittivity and permeability of each element array in the WAIM can be determined by quantitatively observing its response to an incoming plane wave of light at the design frequencies. The process is typically done using commercially available software that solve for electromagnetic scattering parameters, such as Ansoft HFSS (High Frequency Structure Solver) available from Ansoft of Pittsburgh, Pa., CST Microwave Studio available from Computer Simulation Technology of Framingham, Mass., or similar software. The electromagnetic scattering matrix retrieved from a simulation of the physical model of the element array is mathematically processed using an "inverse-problem" approach so as to extract the permittivity (electric) or permeability (magnetic) parameters that would elicit the response indicated in the scattering matrix of the element array. This process can also be done experimentally.

Figure 5:
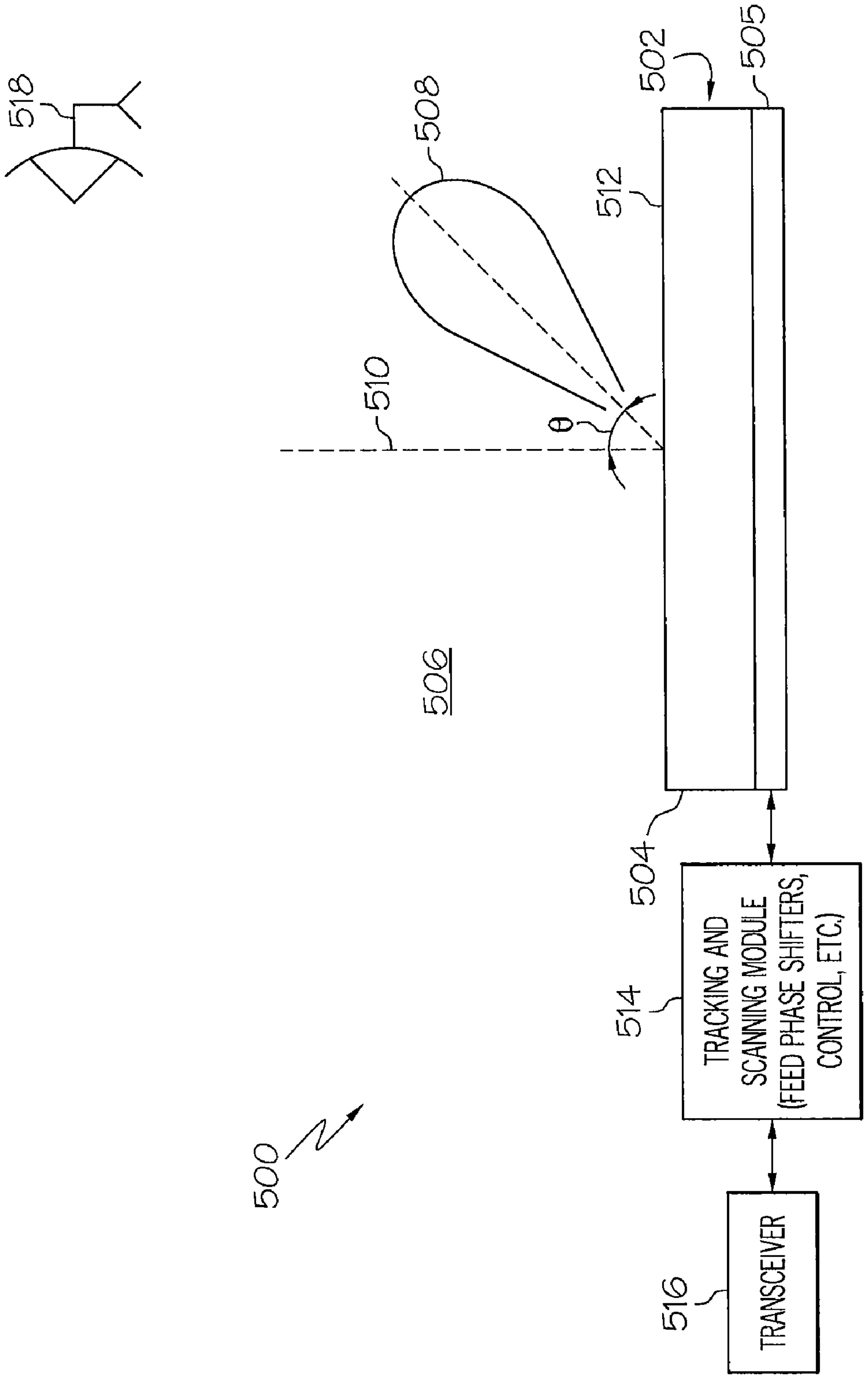
FIG. 5 is an example of a communications system including a phased array antenna system with a WAIM feature using metamaterials in accordance with an aspect of the present invention.

FIG. 5 is an example of a communications system 500 including a phased array antenna system 502 with a WAIM feature 504 using metamaterials in accordance with an aspect of the present invention. The phased array antenna system 502 and WAIM feature 504 may be similar to the phased array antenna system 100 in FIG. 1 and may include a sheet of conductive material 505 with a plurality of aperture antenna elements formed therein and WAIM feature or layer 504. Similar to that previously described, the WAIM feature or layer 504 may include a plurality of metamaterial particles similar to those shown in FIGS. 3 and 4. The metamaterial particles may be selected and arranged to optimize the impedance match between the phase array antenna system 502 and free space 506 to permit scanning of a radiation wave 508 to a wide angle θ relative to a norm (illustrated by broken or dashed line 510) from a face 512 of the phased array 502. The wide angle θ may be at least about 80 degrees relative to the norm 510.

The communication system 500 may also include a tracking and scanning module 514 to control operation of the phased array antenna elements for scanning the radiation beam 508. The tracking and scanning module 514 may control phase shifters associated with feed waveguides (not shown in FIG. 5) similar to waveguides 112 illustrated in FIG. 1 to control the scanning of the radiation beam 508 through the wide angle θ between about 0 degrees normal to the array face 512 and about 80 degrees or more.

The communications system 500 may also include a transceiver 516 to generate communications signals for transmission by the phased array antenna system 502 to a remote station 518 or other object and to receive communications signals received by the phased array antenna system 502.

The flowcharts and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A phased array antenna system, comprising:

a sheet of conductive material;

a plurality of aperture antenna elements formed in the sheet of conductive material, wherein each of the plurality of aperture antenna elements is capable of sending and receiving electromagnetic energy; and a wide angle impedance match (WAIM) layer of material disposed over the plurality of aperture antenna elements formed in the sheet of conductive material, wherein the WAIM layer of material comprises a plurality of metamaterial particles, wherein the plurality of metamaterial particles are selected and arranged to optimize an impedance match between the phased array antenna system and free space to permit scanning of the phased array antenna system up to a predetermined angle in elevation, wherein the plurality of metamaterial particles comprise:

a magnetic metamaterial particle that provide a predetermined magnetic response when energized; and electric metamaterial particles that provide a predetermined electrical response when energized, wherein the magnetic metamaterial particles and the electric metamaterial particles are arranged and designed in a predetermined pattern to optimize an impedance match between the phased array antenna system and free space to permit scanning of the phased array antenna system up to the predetermined angle in elevation.

2. The phased array antenna system of claim 1, further comprising a waveguide feeding each of the plurality of aperture antenna elements.

3. The phased array antenna system of claim 1, wherein the plurality of metamaterial particles are selected to have different electrical and magnetic properties.

4. The phased array antenna system of claim 1, wherein each of the magnetic metamaterial particles comprise a split ring resonator (SRR) or other subwavelength particle through which a magnetic permeability can be artificially generated.

5. The phased array antenna system of claim 1, wherein each of the electric metamaterial particles comprise an electric inductor-capacitor resonator (ELC) or other subwavelength particle through which an electric permittivity can be artificially generated.

6. The phased array antenna system of claim 1, wherein the magnetic metamaterial particles and the electric metamaterial particles are arranged in a periodic array to optimize an impedance match between the phased array antenna system and free space to permit scanning of the phased array antenna system up to the predetermined angle in elevation.

7. The phased array antenna system of claim 1, wherein the magnetic metamaterial particles and the electric metamaterial particles are interwoven to optimize an impedance match between the phased array antenna system and free space to permit scanning of the phased array antenna system up to the predetermined angle in elevation.

8. The phased array antenna system of claim 1, wherein WAIM layer of material comprises an anisotropic WAIM layer of material, wherein a permittivity and permeability are variable within the anisotropic WAIM layer of material to optimize an impedance match between the phased array antenna system and free space to permit scanning of the phased array antenna system up to the predetermined angle in elevation.

9. The phased array antenna system of claim 1, wherein a thickness of the WAIM layer of material and the plurality of metamaterial particles are selected and arranged to provide anisotropic permittivity and permeability within the WAIM layer of material to optimize an impedance match between the phased array antenna system and free space to permit scanning of the phased array antenna system up to the predetermined angle in elevation.

10. The phased array antenna system of claim 1, further comprising a plurality of WAIM layers disposed over the plurality of aperture antenna elements formed in the sheet of conductive material to optimize an impedance match between the phased array antenna system and free space to permit scanning of the phased array antenna system up to the predetermined angle in elevation.

11. A communications system, comprising:

a transceiver to transmit and receive electromagnetic signals;

a tracking an scanning module coupled to the transceiver;

a phased array antenna system coupled to the tracking and scanning module, wherein the phased array antenna system comprises:

a sheet of conductive material;

a plurality of aperture antenna elements formed in the sheet of conductive material, wherein each of the plurality of aperture antenna elements is capable of sending and receiving electromagnetic energy; and a wide angle impedance match (WAIM) layer of material disposed over the plurality of aperture antenna elements formed in the sheet of conductive material, wherein the WAIM layer of material comprises a plurality of metamaterial particles, wherein at least the plurality of metamaterial particles are selected and arranged to provide anisotropic permittivity and permeability within the WAIM layer to optimize an impedance match between the phased array antenna system and free space to permit scanning of the phased array antenna system up to a predetermined angle in elevation.

12. The system of claim 11, wherein the plurality of metamaterial particles comprise:

magnetic metamaterial particles that provide a predetermined magnetic response when energized; and electric metamaterial particles that provide a predetermined electrical response when energized, wherein the magnetic metamaterial particles and the electric metamaterial particles are arranged in a predetermined pattern to optimize an impedance match between the phased array antenna system and free space to permit scanning of the phased array antenna system up to the predetermined angle in elevation.

13. The system of claim 11, wherein a thickness of the WAIM layer of material and the plurality of metamaterial particles are selected and arranged to provide anisotropic permittivity and permeability within the WAIM layer of material to optimize an impedance match between the phased array antenna system and free space to permit scanning of the phased array antenna system up to the predetermined angle in elevation.

14. A method for widening an angular scanning range of a phased array antenna system, comprising:

forming a wide angle impedance match (WAIM) layer of material, wherein forming the WAIM layer of material comprises selecting and arranging a plurality of metamaterial particles to provide anisotropic permittivity and permeability within the WAIM layer to minimize return loss and to optimize an impedance match between the phased array antenna system and free space to permit scanning of the phased array antenna system up to a predetermined angle in elevation;

disposing the WAIM layer of material on a plurality of aperture antenna elements formed in a sheet of conductive material to form the phased array antenna system.

15. The method of claim 14, wherein forming the WAIM layer of material comprises:

tuning the permittivity and permeability of the WAIM layer of material in different directions to minimize return loss and to optimize an impedance match between the phased array antenna system and free space to permit scanning of the phased array antenna system up to a predetermined angle in elevation.

16. The method of claim 15, further comprising performing an optimization to vary the permittivity, permeability and thickness of the WAIM layer of material to minimize return loss and to optimize an impedance match between the phased array antenna system and free space to permit scanning of the phased array antenna system up to a predetermined angle in elevation.

17. The method of claim 14, wherein forming the WAIM layer of material comprises:

forming a plurality magnetic metamaterial particles that each provide a predetermined magnetic response when energized; and forming a plurality of electric metamaterial particles that provide a predetermined electrical response when energized, wherein the magnetic metamaterial particles and the electric metamaterial particles are arranged in a predetermined pattern to minimize return loss and optimize an impedance match between the phased array antenna system and free space to permit scanning of the phased array antenna system up to the predetermined angle in elevation.

18. The method of claim 17, wherein forming each of the plurality of magnetic metamaterial particles comprises forming a split ring resonator and wherein forming each of the plurality of electric metamaterial particles comprises forming an electric inductor-capacitor resonator.

19. The method of claim 18, further comprising at least one of arranging and interweaving the magnetic and electric metamaterial particles to minimize return loss and to optimize an impedance match between the phased array antenna system and free space to permit scanning of the phased array antenna system up to the predetermined angle in elevation.

* * * * *